United States Patent [19]

Nonoyama

[11] Patent Number: 4,736,259

[45] Date of Patent: Apr. 5, 1988

[54] TAPE GUIDE MECHANISM FOR MAGNETIC RECORDING/REPRODUCING APPARATUS

[75] Inventor: Hideki Nonoyama, Tokyo, Japan

[73] Assignee: Sony Corporation, Tokyo, Japan

[21] Appl. No.: 61,001

[22] Filed: Jun. 9, 1987

Related U.S. Application Data

[63] Continuation of Ser. No. 766,267, Aug. 16, 1985, abandoned.

[30] Foreign Application Priority Data

Aug. 27, 1984 [JP]  Japan .................................. 59-177843

[51] Int. Cl.⁴ .......................... G11B 21/04; G11B 5/52
[52] U.S. Cl. .................................. 360/84; 360/130.23
[58] Field of Search ...................... 360/84, 85, 130.23

[56] References Cited

FOREIGN PATENT DOCUMENTS 1579580  4/1976  United Kingdom .

*Primary Examiner*—Robert S. Tupper
*Attorney, Agent, or Firm*—Lewis H. Eslinger

[57] ABSTRACT

A tape guide drum incorporates a rotary drum, has a lead portion on its outer circumferential surface, and has a rotating axis inclined with respect to a reference surface. The first and second guide pins are arranged at the sides of the tape guide drum so as to wrap a magnetic tape around the drum, and are inclined with respect to the reference surface. The first and second guide pins are arranged so that the magnetic tape enters and exits the drum at elevation angles with respect to the lead portion. The wrap central point of the tape around the tape guide drum is spaced apart from a plane including first and second contact points between the first and second guide pins and the central line of the magnetic tape.

4 Claims, 3 Drawing Sheets

TAPE GUIDE MECHANISM FOR MAGNETIC RECORDING/REPRODUCING APPARATUS

This is a continuation of application Ser. No. 766,267, filed Aug. 16, 1985, now abandoned.

BACKGROUND OF THE INVENTION

1. Field of the Invention

The present invention relates to a tape guide mechanism for a magnetic recording/reproducing apparatus having a cylindrical guide drum incorporating a rotary head.

2. Description of the Prior Art

FIG. 1 schematically shows a tape guide mechanism for a tape guide drum 1 incorporating a rotary head in a magnetic recording/reproducing apparatus of helical scan type.

The drum 1 is arranged inclined at a predetermined angle with respect to a reference surface 2. A magnetic tape 3 is passed from a guide roller 4 through a guide point a of an inclined guide pin 5 and is wrapped around the circumferential surface of the drum 1 so as to oppose a rotary head. The tape is wrapped through a wrap angle of about 180° from an entrance point b to an exit point d through a central point c. The magnetic tape 3 is then passed to a guide roller 7 through a guide point e of an inclined guide pin 6. In FIG. 1, the respective points a, b, c, d and e are illustrated as points on the central line of the magnetic tape 3 along its widthwise direction. A tape lead step (not shown) having a lead angle $\alpha$ for regulating downward movement of the magnetic tape 3 is formed downward movement of themagnetic tape 3 is formed on the circumferential surface of the drum 1 in a known manner. The magnetic tape 3 is driven on this tape lead step.

In a tape guide mechanism of the type described above, the magnetic tape 3 can be stably driven by properly selecting, in accordance with a predetermined equation, the diameter and the inclination angle of the drum 1 with respect to the reference surface 2, the diameter and the inclination angle of the guide pins 5 and 6 with respect to the reference surface 2, the wrap angle of the magnetic tape 3 around the drum 1, i.e., the angle from the point b to the point d, a distance $l_1$ between the points a and b, a distance $l_2$ between the points d and e, and an angle $\alpha$ (lead angle) of the magnetic tape 3 at the point c with respect to a single plane f including the points a, c and e.

Other important conditions for stably driving the magnetic tape 3 are that the heights at the points a, c and e from the reference surface 2 be equal to each other, and the plane f be parallel to the reference surface 2.

In the above tape guide mechanism, the distances $l_1$ and $l_2$ are equal to each other. Therefore, the guide roller 4, the guide pin 5, the guide roller 7, and the guide pin 6 can be symmetrically arranged with respect to the drum 1. This allows easy design and reduces the overall size of the apparatus.

Thus, although the above-mentioned tape guide mechanism has various advantages as noted above, satisfactory regulation of widthwise movement of the magnetic tape 3 on the circumferential surface of the drum 1 cannot be obtained. For this reason, the magnetic tape 3 tends to float upward from the tape lead step on the circumferential surface of the drum 1.

In accordance with a technique proposed to overcome this drawback, when the magnetic tape 3 enters from the entrance point b, it is allowed to enter inclined upward by an elevation angle $\theta_1$ as indicated by a dotted line in FIG. 1. When the magnetic tape 3 is passed through the exit point d, it is guided inclined upward at an elevation angle $\theta_2$ as also indicated by a dotted line. A force acts to urge the magnetic tape 3 toward the tape lead step so as to regulate the widthwise movement of the magnetic tape 3.

This technique is disclosed, for example, in Japanese Patent Disclosure No. 58-121170. With the condition that the plane f is parallel to the reference surface 2, in order to incline the magnetic tape 3 at the angles $\theta_1$ and $\theta_2$ as indicated by the dotted lines in FIG. 1, the guide points a and e must be shifted with respect with respect to drum 1 to positions indicated by the dotted lines in FIG. 1. The That is, the guide pin 5 must be moved closer to the drum 1 and the guide pin 6 must be moved away from the drum 1 to positions indicated by the dotted lines. The angles $\theta_1$ and $\theta_2$ are normally small angles, e.g., 1.0 to 1.5°. However, the corresponding moving distances of the guide pins 5 and 6 are relatively large. In this case, if the wrap angle of the magnetic tape 3 around the drum 1 is large, e.g., 180° or more, no problem occurs. However, if the wrap angle is small, e.g., about 90°, the moving distance of the guide pin 6 is set to be several to several tens of times that of the guide pin 5. Thus, when the point a is moved on the plane f, if it is moved a small distance to the point $a_1$, the tape is inclined upward by the angle $\theta_1$. However, when the point e is moved on the plane f, the magnetic tape 3 is not inclined upward by the angle $\theta_2$ unless the point e is moved a long distance to the point $e_1$.

As a result, as shown in FIGS. 2 and 3, the distance $l_2$ is rendered far larger than the distance $l_1$ (in the illustrated example, $l_2 \approx 4 l_1$). Then, the arrangement of the guide roller 4 and the guide pin 5, and the guide roller 7 and the guide 6 becomes nonsymmetrical with respect to the drum 1. A difficulty occurs in mechanism design, and prevents the manufacture of a compact apparatus.

OBJECTS OF THE INVENTION

It is an object of the present invention to provide a tape guide mechanism for a magnetic recording/reproducing apparatus wherein inclined guide pins at entrance and exit of a drum can be arranged at points most preferable in terms of design when a magnetic tape enters the drum at an elevation angle $\theta_1$ and exits at an elevation angle $\theta_2$.

It is another object of the present invention to provide a tape guide mechanism for a magnetic recording/reproducing apparatus, capable of regulating widthwise movement of the magnetic tape along the circumferential surface of the drum.

It is still another object of the present invention to provide a tape guide mechanism for a magnetic recording/reproducing apparatus wherein guide pins at drum entrance and exit can be arranged symmetrically with respect to the drum.

DETAILED DESCRIPTION OF THE PREFERRED EMBODIMENT

Figure 1:
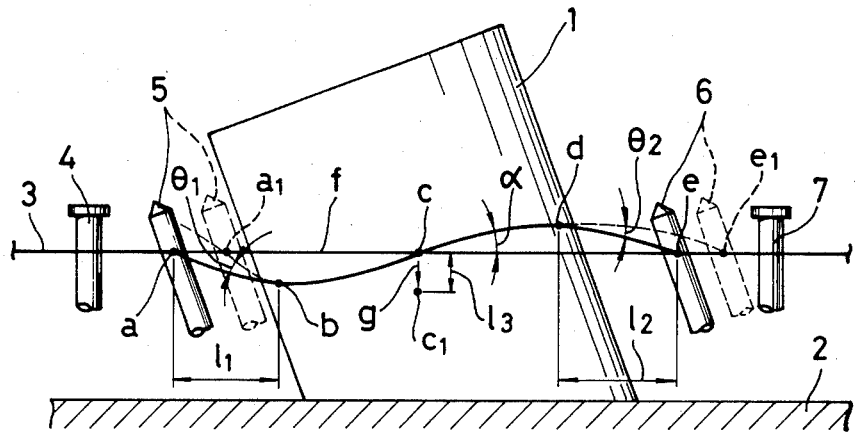
FIG. 1 is a schematic side view showing an embodiment of the present invention and for explaining a conventional mechanism.
Figure 2:
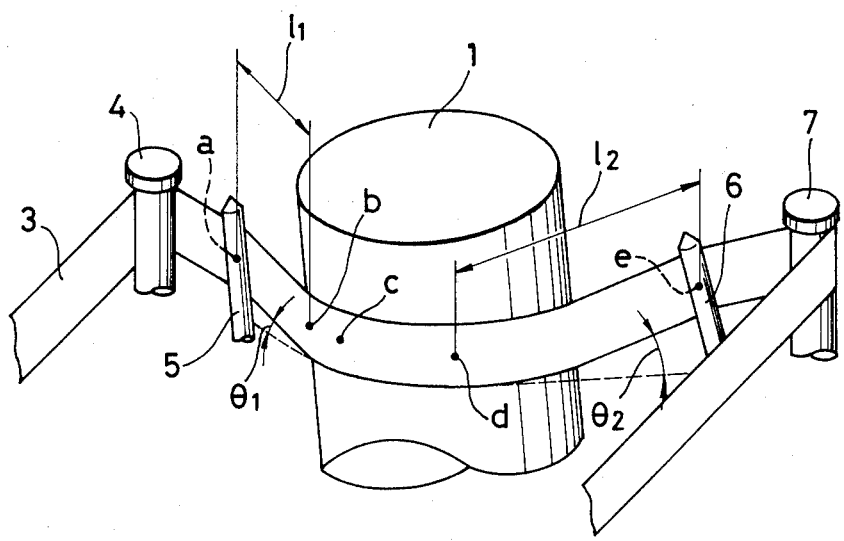
FIG. 2 is a perspective view of a tape guide mechanism wherein the tape is guided at an elevation angle.
Figure 3:
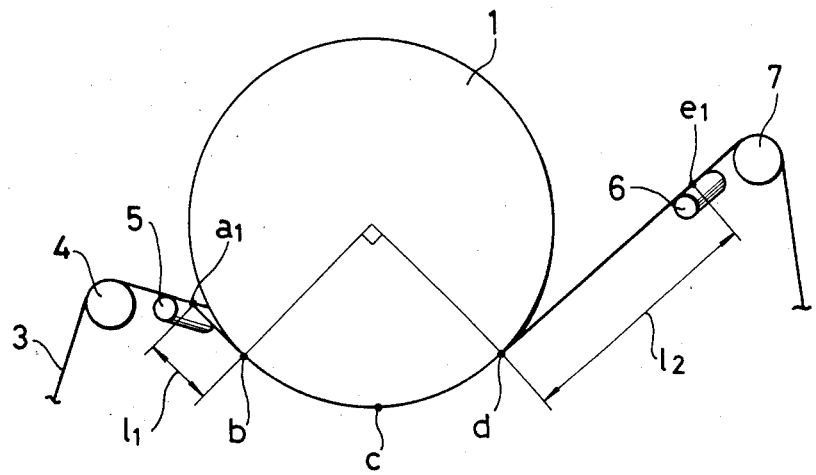
FIG. 3 is a schematic plan view of the mechanism shown in FIG. 2.
Figure 4:
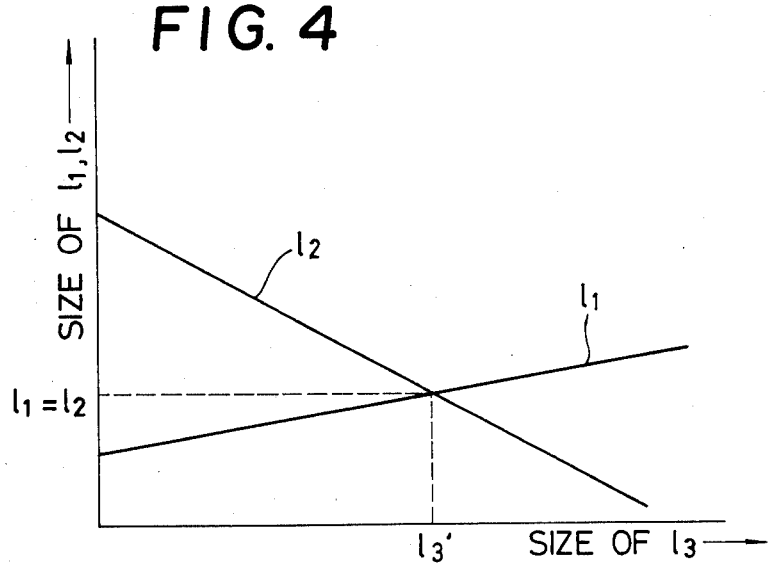
FIG. 4 is a graph showing the distance from the inclined guide pins at the entrance and exit to the drum as a function of the moving distance of the tape wrap central position.
Figure 5:
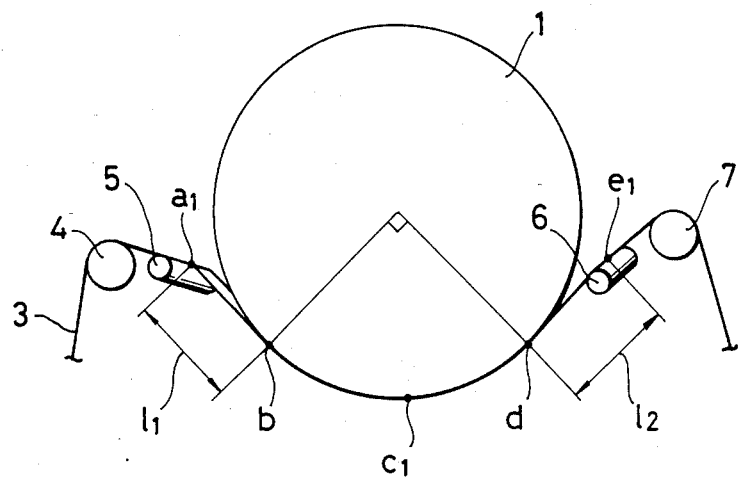
FIG. 5 is a schematic plan view showing an embodiment of the present invention.

Referring to FIG. 1, assume that the point a is shifted to the point $a_1$ to incline the magnetic tape 3 upward at the elevation angle $\theta_1$, and that the point e is shifted to the point $e_1$ to incline the magnetic tape 3 upward by the elevation angle $\theta_2$. In this case, if the point c is moved downward by a distance $l_3$ while the points $a_1$ and $e_1$ are on the plane f, it was found by the present inventors that the distances $l_1$ and $l_2$ change as shown in FIG. 4. Therefore, when a distance $l_3'$ satisfying the condition $l_1=l_2$ is calculated in accordance with FIG. 4 and the point c is shifted to the point $c_1$, the distance $l_1$ between the points $a_1$ and b can be set to be equal to the distance $l_2$ between the points d and $e_1$, as shown in FIG. 5.

With the above arrangement, the guide roller 4 and the guide pin 5, and the guide roller 7 and the guide pin 6 can be set to be symmetrical about the drum 1. Note that FIG. 4 is a graph showing the characteristics for improving the relationship between the distances $l_1$ and $l_2$, i.e., the relation $l_2 \approx 4l_1$. Referring to FIG. 4, when $l_3=0$, $l_2 \approx 4l_1$.

According to the above embodiment, $l_1=l_2$. However, in general, when the distance $l_3$ is selected, the distances $l_1$ and $l_2$ can be freely selected. Therefore, the guide rollers 4 and 7 and the guide pins 5 and 6 can be arranged at positions allowing easiest design.

What is claimed is:

1. A tape guide mechanism for a recording/reproducing apparatus comprising:

a tape guide drum having an axis of rotation, an outer surface, a rotary recording/reproducing head and a lead portion for regulating a drive position of a magnetic tape on said outer surface, said axis of rotation being inclined with respect to a reference plane (2);

first and second guides mounted adjacent to said drum and inclined with respect to said reference plane so as to wrap a magnetic tape around said drum through a fixed wrap angle;

a central line of said tape that extends in the longitudinal direction thereof and is centered in the widthwise direction thereof being inclined with respect to said reference plane and guided from a wrap start entrance point (b) to a wrap end exit point (e) through a displaced wrap central point ($c_1$);

said displaced wrap central point ($c_1$) being spaced apart by a displacement distance ($l_3$) from a wrap central point (c);

said wrap central point (c) lying in a plane (f) that is parallel to said reference plane and includes first and second contact points (a, e);

said first contact point (a) being at an intersection of said first inclined guide and said central line and said second contact point (e) being at an intersection of said second inclined guide and said central line;

wherein said first and second inclined guides are arranged so that said magnetic tape enters said entrance point in a direction forming a fixed elevation angle ($\theta_1$) with respect to said lead portion and exits a fixed elevation angle ($\theta_2$);

whereby said displacement distance ($l_3$) determines said first and second distances ($l_1$, $l_2$).

2. A mechanism according to claim 1, wherein the wrap angle of said magnetic tape around said tape guide drum is less than 180°.

3. A mechanism according to claim 1 or 2, wherein the wrap angle of said magnetic tape around said tape guide drum is about 90°.

4. A mechanism according to claim 1, wherein said third distance is selected so that said first and second distances are substantially equal to each other.

* * * * *